United States Patent
McLean et al.

(10) Patent No.: US 10,151,417 B2
(45) Date of Patent: Dec. 11, 2018

(54) TURN-KEY ACOUSTIC PIPE LAGGING SYSTEM

(71) Applicant: Armacell Enterprise GmbH & Co. KG, Schönefeld (OT Waltersdorf) (DE)

(72) Inventors: Bret L. McLean, Mebane, NC (US); David A. Cowan, Mebane, NC (US); Jeffrey S. Lippy, Mebane, NC (US)

(73) Assignee: ARMACELL ENTERPRISE GMBH & CO. KG, Schönefeld ot Waltersdorf (DE)

( * ) Notice: Subject to any disclaimer, the term of this patent is extended or adjusted under 35 U.S.C. 154(b) by 0 days.

(21) Appl. No.: 15/201,858

(22) Filed: Jul. 5, 2016

(65) Prior Publication Data

US 2017/0009927 A1    Jan. 12, 2017

Related U.S. Application Data

(60) Provisional application No. 62/188,872, filed on Jul. 6, 2015.

(51) Int. Cl.
*F16L 59/14* (2006.01)
*F16L 55/033* (2006.01)

(52) U.S. Cl.
CPC ...... *F16L 55/0336* (2013.01); *E03C 2201/60* (2013.01)

(58) Field of Classification Search
CPC .................. Y10T 137/7036; F16L 59/161
USPC ........... 138/155, 156, 158, 149, 161; 285/47
See application file for complete search history.

(56) References Cited

U.S. PATENT DOCUMENTS

| | | | | |
|---|---|---|---|---|
| 3,000,433 A | * | 9/1961 | Kemper | F16L 59/024 138/147 |
| 3,724,491 A | * | 4/1973 | Knudsen | F16L 59/161 137/375 |
| 4,207,918 A | * | 6/1980 | Burns | F16L 59/168 137/375 |
| 4,259,981 A | * | 4/1981 | Busse | F16L 59/161 137/375 |

(Continued)

FOREIGN PATENT DOCUMENTS

| CN | 2011193352 Y | 2/2009 |
|---|---|---|
| CN | 201224905 Y | 4/2009 |

(Continued)

*Primary Examiner* — Patrick F Brinson
(74) *Attorney, Agent, or Firm* — Rothwell, Figg, Ernst & Manbeck, P.C.

(57) ABSTRACT

A pipe lagging system for acoustically insulating a drain piping system includes at least one drain pipe and drain pipe connector coupled to the drain pipe. The pipe lagging system includes at least one preformed acoustic lagging sleeve adapted to be put over the drain pipe of the piping system for acoustical insulation, at least one preformed acoustic clamshell jacket adapted to fit over the drain pipe connector of the piping system for acoustically insulating the pipe connector. The clamshell jacket is adapted to receive an end portion of the tubular sleeve put over the drain pipe. At least one mechanical fastener is adapted to mechanically secure the clamshell jacket and the received tubular sleeve to the underlying drain pipe. At least one of the at least one tubular sleeve and clamshell jacket includes a sound-insulating foam material.

21 Claims, 4 Drawing Sheets

(56) References Cited

U.S. PATENT DOCUMENTS

| | | | | |
|---|---|---|---|---|
| 4,696,324 A | * | 9/1987 | Petronko | F16L 59/04 137/375 |
| 4,807,669 A | * | 2/1989 | Prestidge, Sr. | F16L 59/161 137/375 |
| 4,925,605 A | * | 5/1990 | Petronko | F16L 59/04 264/230 |
| 5,027,493 A | * | 7/1991 | Wood, Jr. | E03D 1/01 29/401.1 |
| 5,060,752 A | * | 10/1991 | Heiberger | E04B 1/8218 181/200 |
| 5,360,031 A | * | 11/1994 | Trueb | F16L 59/11 137/375 |
| 5,941,287 A | * | 8/1999 | Terito, Jr. | F16L 59/161 138/149 |
| 6,202,702 B1 | * | 3/2001 | Ohira | F16L 59/021 138/141 |
| 6,530,603 B1 | * | 3/2003 | Hartman | F16L 59/161 138/156 |
| 6,789,645 B1 | * | 9/2004 | Deblander | E04B 1/86 181/284 |
| 7,100,641 B2 | * | 9/2006 | Tyrer | F16L 1/123 138/110 |
| 7,168,452 B2 | * | 1/2007 | Sasaki | F16L 53/005 138/110 |
| 7,947,354 B2 | * | 5/2011 | Pirogovsky | F16L 59/168 138/149 |

FOREIGN PATENT DOCUMENTS

| | | |
|---|---|---|
| DE | 1901263 U | 9/1964 |
| DE | 6937355 | 3/1970 |
| DE | 3035199 A1 | 3/1982 |
| DE | 8205672.2 | 8/1982 |
| DE | 9305208.1 | 8/1993 |
| DE | 20312763 U1 | 10/2003 |
| EP | 0540935 A1 | 5/1993 |
| GB | 1307946 A | 2/1973 |
| GB | 2241546 A | 9/1991 |
| JP | 2001263573 A | 9/2001 |

\* cited by examiner

TURN-KEY ACOUSTIC PIPE LAGGING SYSTEM

This application claims the benefit of U.S. Patent Application No. 61/188,872 filed on Jul. 6, 2016, the disclosure of which is incorporated by reference in its entirety.

The present invention relates to a pipe lagging system for acoustically insulating a drain piping system.

BACKGROUND OF THE INVENTION

Solutions are required for the management of unwanted noise generated from gravity drain systems in buildings as the industry rapidly moves away from the standard heavy cast iron drain pipe systems to lighter weight plastic drain pipes. This move to plastic drain pipes has largely already occurred in the residential housing market and is now occurring in commercial buildings on an international scale.

The prior art relative to acoustic treatments for plastic drain pipe involve wraps which must be custom slit and taped in straight pipe runs and further require complicated cuts, gluing and taping at 'T', 'Y', straight union, etc. intersections. These solutions add significant weight to the building e.g. increasing the overall capital cost of the structure and require special skills/tradesmen and special taping and gluing materials to install. The efficacy of these systems over long periods of time is unpredictable as the taped/glued joints can fail forming gaps and subsequently defeating the acoustic performance of the system.

Prior art includes all current products that require: a higher level of trade skill at the job to install due to required custom slitting, gap sealing with expensive specialty tapes which lose efficacy over time as the tape fails. In one system, a special clip is required that does not affect a predicable seal around the foil covered fiber glass heavy plastic composite causing gapping and lose efficacy over time as the wrap gaps and fails. Examples of prior art include Netlag®, Soundlag® and Armawave® which address the acoustics problem however have the problems of being very expensive, exhibit higher installation costs, can be easily damaged during installation, and are very heavy.

One object of the present invention is to overcome the above identified problems in conjunction with conventional sound insulation systems.

SUMMARY OF THE INVENTION

There is provided a pipe lagging system for acoustically insulating a drain piping system comprising at least one drain pipe and drain pipe connector coupled to the drain pipe, wherein the pipe lagging system comprises at least one preformed acoustic lagging sleeve adapted to be put over the drain pipe of the piping system for acoustical insulation; at least one preformed acoustic clamshell jacket adapted to fit over the drain pipe connector of the piping system for acoustically insulating the pipe connector, wherein the clamshell jacket is adapted to receive an end portion of the tubular sleeve put over the drain pipe; and at least one mechanical fastener adapted to mechanically secure the clamshell jacket and the received tubular sleeve to the underlying drain pipe, wherein at least one of the at least one tubular sleeve and clamshell jacket comprises a sound-insulating foam material.

According to one implementation the novel Turn-Key easy to install Acoustic Pipe Lagging System is composed of light weight convoluted PE foam tubular sleeves with a dense skin, acoustic clam shell jackets configured in a 'T', 'Y' and straight and angular union geometries for pipe intersections and annular mechanical fasteners. This system provides a fast installation, free of gaps from failing tapes and glues. It provides a continuous acoustical insulation barrier encasing the entire gravity drain piping array. The included easy to install acoustic sleeve slides over the plastic drain pipe forming a continuous acoustic barrier from pipe connector to pipe connector. The acoustic clam shell jacket forms a continuous, permanent and easy to install enclosure adapted to fit over the piping connectors, completely sealing the pipe lagging sleeve by the application of even inward mechanical pressure provided by ratcheting lock action of the annular fasteners.

This ready to install acoustic lagging system ensures complete encapsulation of the piping system installation from end to end, ensuring minimal noise transmission. This light weight lagging minimizes the cost of installing ancillary structural supports and additional cost to the framing system. The systemized combination of the acoustic sleeve, clam shell jacket, and mechanical fastening provides a fast, economical, permanent solution for managing noise emanating from gravity drain piping in commercial and residential buildings. This system is easy to install requiring low skill level workers at the building site. It is light weight, in some embodiments about 3 to 5 times lighter than current systems with an exemplary range of 3 to 4 times lighter than current systems. It exhibits a higher efficacy level vs. tape systems where the glue layer can creep over time exhibiting cohesive/shear failure. This system features a one piece/mechanically fastened acoustic enclosure jacket for which permanently covers and seals arrays of gravity drains in commercial and residential buildings.

BRIEF DESCRIPTION OF DRAWINGS

Further details, aspects and advantages of the present disclosure described herein will become apparent from the following drawings, in which.

DETAILED DESCRIPTION OF THE INVENTION

In the following description, for purposes of explanation and not limitation, specific details are set forth in order to provide for a thorough understanding of the technique presented herein. It will be apparent to one skilled in the art that the disclosed technique may be practised in other embodiments that depart from these specific details.

Figure 1:
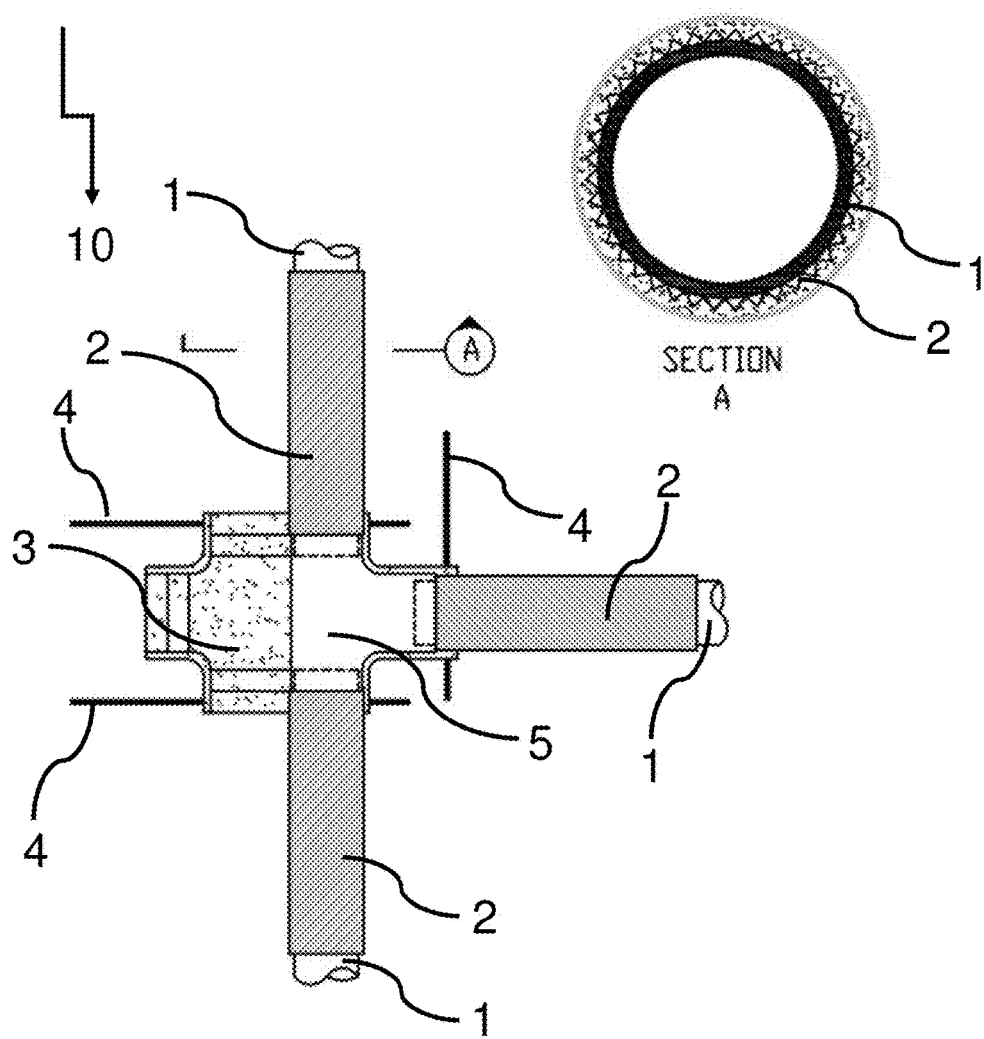
FIG. 1 is a top plan view showing invention in use, and section A thereof is a sectional view along line A.
Figure 3:
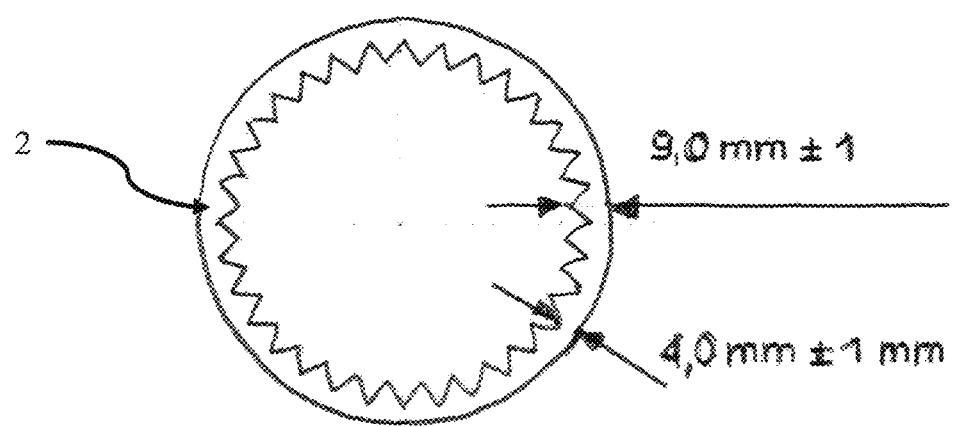
FIG. 3 is a cross-sectional drawing of the of the tubular sleeve.

FIG. 1 illustrates a embodiment of an acoustic pipe lagging system 10. The system comprises at least one acoustic lagging sleeve 2, at least one clam shell jacket 3 and at least one annular mechanical fastener 4. The at least one sleeve 2 is adapted to fit over a drain pipe 1 of the drain piping system. It comprises a foam core and an outer skin as illustrated in the sectional view A in FIG. 1. Both, the skin and foam core may comprise a polyolefinic material, preferred a polyethylene material. The foam core may be extruded to a foam with specific blowing agents. The foam core may comprise nucleating agents, fire retardants and additives. The skin may be a polyethylene material which is not foamed and thus, has a higher density in comparison to the foam core. Moreover, the at least one sleeve 2 may comprise a convoluted or contoured inner surface (see FIGS. 1 and 3) which is in contact with the drain pipe 1 when the sleeve 2 is put over the pipe 1.

Figure 2:
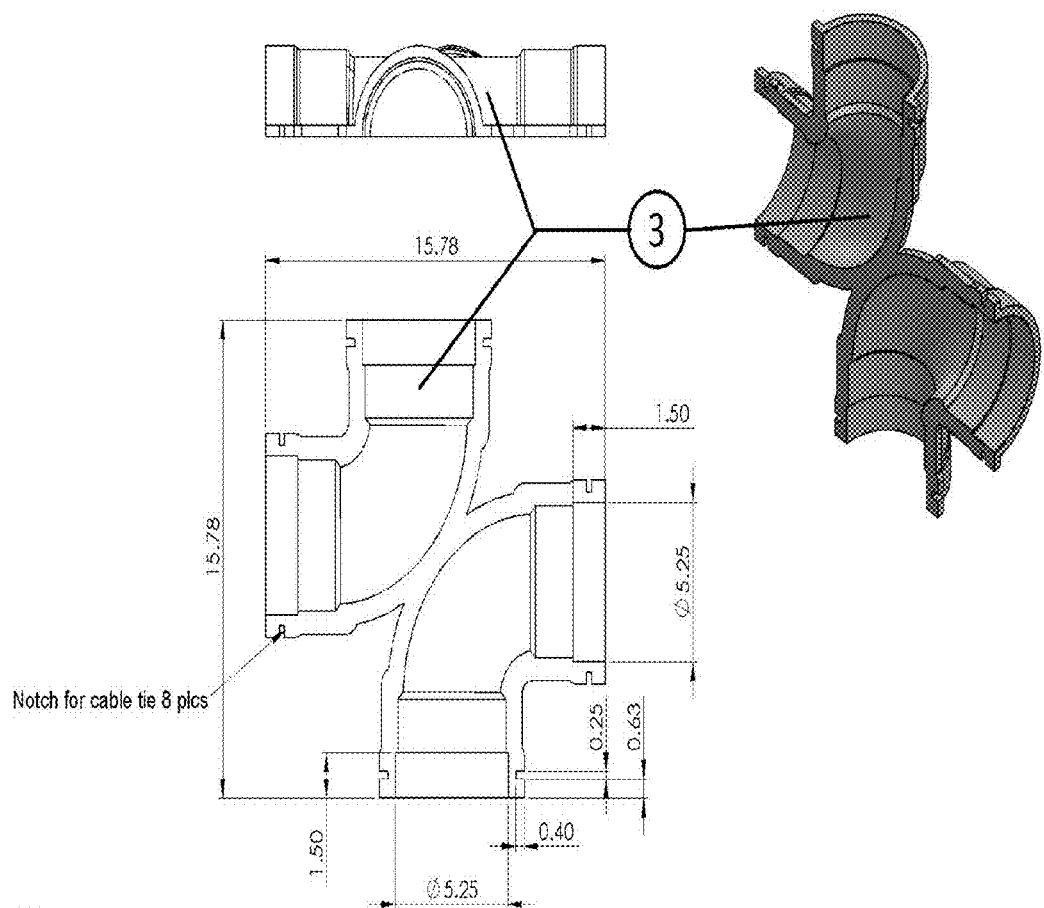
FIG. 2 shows perspective, side and internal view of one embodiment, with dimensions shown in inches.

The clam shell jacket 4 is adapted to fit over a drain pipe connector 5 of the drain piping system. Further, the jacket 4 is adapted to receive an end portion of the sleeve 2 when installed on the pipe connector 5 as illustrated in FIGS. 1 and 2. A claim shell jacket 4 may be made of polyolefinic material, preferred of polyethylene material.

Figure 4:
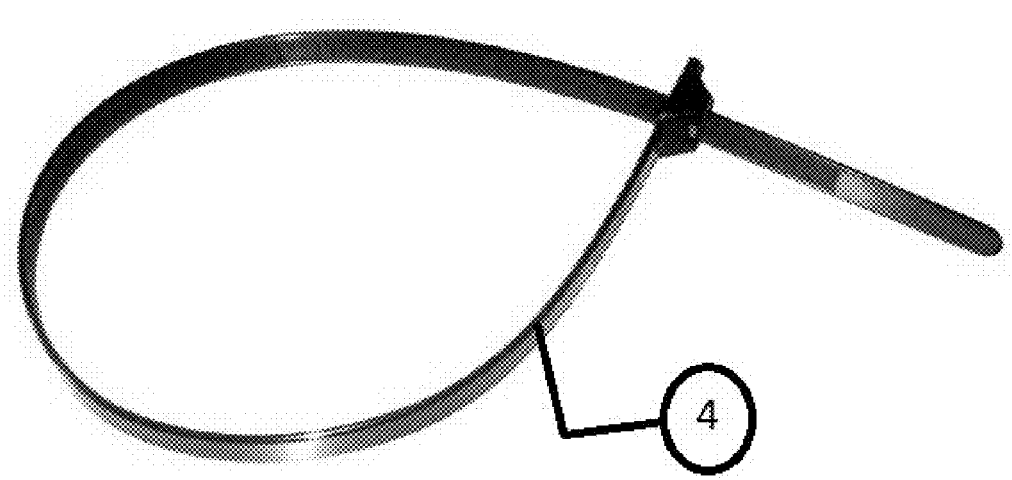
FIG. 4 is a perspective view of a fastener for use in one embodiment.

The at least one mechanical fastener 4 (see FIG. 4) is adapted as an annular strap and a locking system for uniformly clamping along circumferential direction the clamshell jacket 4 and the sleeve 2 to the piping system.

The installed system 10 can maintain a decrease in the measured and heard sound within a range about 10 to 20 dB and with an exemplary range of about 11 to 15 dB from gravity drain pipes. When this system is applied to plastic drain pipes 1 from about 1 inch in diameter to 8 inches in diameter it controls heard and measured low frequency sound in the range extending from 20 hertz to 20,000 hertz (Hz), preferably about 50 hertz to 10,000 hertz with an exemplary range of 200 hertz to 1000 hertz, generated from water in gravity drains to a level that is superior to that of iron pipes. Therein, it facilitates the use of light weight plastic pipe 1 in commercial and residential buildings with decreased measured and heard levels of sound by building occupants. This is accomplished with a total lower capital cost to build versus utilizing iron pipes. The total carbon foot print will also be lower versus iron pipe and all other prior art systems exhibiting a published 233 times less CO2 emissions for substituting the polymeric foams versus the fiberglass contained in prior art systems. This system eliminates the need for mass loaded vinyl in plastic drain pipe systems if the goal is to attain performance that is at parity or better than iron pipe. This system eliminates the need for tapes and glues for long run joints and connections 5. There may be no maintenance issues with this system relative to gapping or slipping at seam interfaces or connection points 5. This is because there are very few seams and all connections points 5 are clamped 4 and enclosed in a composite foam clam shell 3 held in place by an annular mechanical strapping system 4. In certain embodiments, there are no longitudinal seams along the long axis of the straight plastic piping runs 1, therefore there is nothing to glue, tape or fail over time as with prior art products which are manually wrapped pipe lagging solutions such as Netlag®, Soundlag® and Armawave® which have many longitudinal, lateral and angled or custom cut seams which must be cut, glued and taped. The sleeve 2 provides continuous insulation without the need for adhesives or taping. The composite foam clam shell 3 results in continuous insulation without the need for adhesives or taping. The clam shell Jackets 3 encapsulate the pipe connectors 5 without gaps. The system meets ASTM E 84

The installation of this system requires only a low skilled level of labor while achieving a superior longer performing installation. The included easy to install acoustic sleeve 2 slides over the plastic drain pipe 1 forming a continuous acoustic barrier from pipe connector 5 to pipe connector 5. The acoustic clam shell jacket 3 forms a continuous, permanent and easy to install enclosure adapted to fit over the piping connectors 5, completely sealing the pipe lagging sleeve 2 combined with the application of even inward mechanical pressure provided by annular fastener 4 (e.g. see FIG. 4). The ratcheting lock action provided by the mechanical fasteners 4 secures the seal permanently. This design prevents point compression loads which lead to gaps and leakage of sound. The ductility properties of the Polyolefinic (e.g., polyethylene) foam as well as its slick, self lubricating surface which is characteristic of polyolefinic materials facilitate an easy installation. The tough denser polyolefin surface facilitates easy installation without compression set damage that can be associated with prior art materials as well as other polymeric foams. Compression resistance at 25% compression when measured in pounds per square inch (psi) can range from about 3 to 25 psi with an exemplary range from about 3 to 8 psi. Sliding the sleeves 2 over the pipe eliminates the manual wrapping of pipes 1 and connections 5. The thickness of the sleeve ranges from about ¼" to 1" with a nominal size of about ⅜". The foam inner layer can be about ⅜" in thickness, and the outer skin can be about 0.1-0.4 millimeters thickness.

Prior art products such as NetLag®, Soundlag® and Armawave® utilize manual wrapping, gluing and taping to encapsulate the gravity drain pipes. The Turn Key Acoustical Pipe Lagging System provides continuous acoustical insulation for plastic gravity drain assemblies. The system encapsulates the plastic gravity drain piping system 1 and its connections 5 ensuring a continuous insulation reducing noise by low flow liquids. The Turn-key Acoustic Pipe Lagging System uses a sleeve of dual density insulation 2 which is slid over the plastic pipe 1 providing a seamless, gapless, continuous cover of insulation that manages a wide frequency of sound generated from within the gravity drain pipe 1. Excellent performance was measured in 3rd party acoustics laboratories on full scale assemblies in the exemplary frequency range of about 315 to 800 hertz region which is the difficult to address frequency range for sound generated by water flowing through plastic gravity drains in buildings. The outer dense polymer skin of sleeve 2 as well as the jacket 3 provide reflective properties across a broad range frequencies therein reflecting sound instead of transmitting the sound from the gravity into the building. The durable coating on the dual density foam tube 2 also provides a moisture barrier and installation protection. The density of this skin measured in pounds per cubit foot (pcf) can range from 40 pcf to 65 pcf, preferably from about 55 pcf to 62 pcf. The foam core density can range from 1.0 pcf to 10 pcf, preferably from about 1.5 pcf to 10 pcf with an exemplary range from about 1.3 to 2.0 pcf. The composite (i.e. foam core and skin) can be formed by co extrusion, tandem extrusion or lamination utilizing heat or adhesive.

There are several features in the turn key system 10 itself and in the installation of this system that cause it to exhibit broad spectrum acoustic performance. There is a high density outer skin 3 on the tubes surface, a lower density foam core 2 and a convoluted or contoured inner surface (see FIG. 3) that is in contact with the gravity drain pipe 1 itself. These compositional items combined with how the system is assembled and the longevity of the assembly cause it to work to maintain system efficacy during and after the installation in the commercial and residential buildings. It is well documented that gaps during installation or after installation due to interfacial cohesive/adhesive failures in tape and glue cause significant performance issues in the existing prior art. Additionally, most of these systems contain a significant layer of fiber glass which will naturally densify due to the effects of gravity and will eventually get wet, due to condensation, inside the fire rated chase. Wet or damaged insulation of any type will not recover to the original 'as specified' condition of use. Therefore it represents a poor material of choice in areas prone to moisture and bulk water exposure. Fiberglass and rock wool absorb 1 percent of their weight when wet. The short term effect of either of these modes of densification events will be a resulting failure along the pipe 1 and at connection points 5 due to gapping which allows the sound to transmit to the outside therein deteriorating the systems performance. Once all of the pipes 1 are installed to the system connectors 5 with the insulation sleeves 2 for the plumbing section a sealing jacket 3 is placed over the connector 5 and extends over the insulation sleeves 2. The jacket 3 is then secured in place with the annular mechanical fastener 4 on all connector 5 openings to ensure a complete seal. This process is repeated until the entire above ground gravity piping system is encapsulated with the Acoustical pipe lagging.

There is a need for Turn-Key, easy to install Acoustic Pipe Lagging Systems that manage unwanted noise generated from gravity drain systems in residential and commercial buildings. The commercial and residential building and construction industry is rapidly moving away from standard heavy cast iron drain pipe systems to lighter weight plastic drain pipes. This change has largely already occurred in the residential housing market and is now occurring in commercial buildings on an international scale. The specified lightweight drain systems transmit sound into structures and occupied rooms and spaces. The acoustic pipe lagging system kit consists of the following components: 2 tubular dual density polymer foam profile exhibiting an inner diameter which is slightly larger than the pipe 1 that it covers, 3 a hinged, foam clamshell connection jacket available in required geometries e.g. straight coupling, angular elbow, 'T' connection, 'Y' connection and multiple reducer connectors. A mechanical locking annular ring pressure connector 4 for each end of the clamshell jacket 3 (see FIG. 1).

The installation is initiated by first sliding the tubular acoustic pipe insulation sections 2 over the straight pipe sections 1 tight to each sequential connection flange 5. Then hinged foam clamshell connection jackets (in required geometries) 3 are snapped over each flanged intersection 5 and secured with a self centering annular tie 4 which applies even pressure about the circumference of the pipe 1. These annular ties 4 are secured to each end of the connection jacket 3 to secure the hinged clamshell jacket 3 to the converging tubular dual density polymer foam profiles 2 and therein mechanically secure these foam profiles 2 to the underlying drain pipe 1 without the need of tapes and adhesives. The result is a complete system wide acoustic seal for each given straight pipe 1, straight sleeve connection 5, 'T' connection 5, 'Y' connection 5, and angular elbow connection 5. Acoustic bridging has been managed to a level in the range of about 10 to 20 dB in noise reduction on plastic gravity piping systems with an exemplary range of about 11 to 15 dB.

The cumulative effect of sound reduction by employing foam core, convoluted inner surface and outer dense skin is summarized in Table 1 below. As shown in table 1, a sound reduction of 3-5 dB can be reached by each, the foam core and the inner surface convolution. Further, by additionally employing a dense skin layer the sound can additionally be reduced by 1-3 dB (see middle column in Table 1). Accordingly, the cumulative sound reduction by the present system employing foam core, convoluted inner surface and dense outer skin amounts to 7-13 dB.

TABLE 1

| Acoustical Advantage | Sound Pressure Reduction | Cumulative Reduction |
| --- | --- | --- |
| PE Foam | 3 to 5 dB | 3 to 5 dB |
| Convolution | 3 to 5 dB | 6 to 10 dB |
| Dense Skin | 1 to 3 dB | 7 to 13 dB |

The existing acoustic gravity pipe lagging solutions are sold in sheet form requiring the installer to custom cut multiple materials to fit each pipe size at each connection and change in direction. The novel turn-key acoustic pipe lagging system sleeve 2 is delivered to the job site in a 'pre-molded' part adapted to fit over the pipe size being covered. The prior art/already in use flat material then must be subsequently taped or adhered along each of many seams. This turn-key systems deploys sleeves are continuous and therefore do not have seams. The flat systems require a series of complicated cuts cuttings to form a combination of parts to fit around connections like a Tee or a Y. These cuttings create costly scrap of value added materials at the job site. The novel foam clamshell connection jackets 3 fit over the entire connector 5 as well as the sleeve 2 to ensure a complete piping system encapsulation. The already in use flat material requires tape and adhesives to maintain theses seals at seams and connector interfaces. The Turn-key Acoustic Pipe Lagging System may use annular mechanical fasteners 4 with ratcheting lock action to maintain a permanent acoustical seal. The flat material is expensive and requires heavier pipe hangers and structural supports as they often contain a layer of heavy loaded vinyl or similar material. A weight analysis of the sleeve 2 the foam clamshell connection jacket 3 and the mechanical fasteners 4 result in a weight which can be about 3 to 5 times less than that of the current systems. Therefore the novel assembly exhibits a weight that is a fraction of the weight of the PVC pipe assembly. The combination of cost, weight and intense installation labor cost provide little advantage for the wrapped systems over a building which simply uses the old standard cast iron pipe system. The Turn-key Acoustic Pipe Lagging System installed over plastic pipe results in a system cost which can be about 3 to 6 times less than the cost of cast iron pipe.

FIGS. 1-4 are intended to be merely illustrative of the teachings of the principles and methods described herein and which principles and methods may applied to design, construct and/or utilize pipe lagging systems. Furthermore, foregoing description is directed to particular embodiments of the present disclosure for the purpose of illustration and explanation. It will be apparent, however, to one skilled in the art that many modifications and changes to the embodiment set forth above are possible without departing from the scope of the disclosure.

The invention claimed is:

1. A pipe lagging system for acoustically insulating a drain piping system comprising at least one drain pipe and drain pipe connector coupled to the drain pipe, the pipe lagging system comprising:
at least one preformed acoustic lagging sleeve adapted to be put over the drain pipe of the piping system for acoustical insulation;
at least one preformed acoustic clamshell jacket adapted to fit over the drain pipe connector of the piping system for acoustically insulating the pipe connector, wherein the clamshell jacket is adapted to receive an end portion of the tubular sleeve put over the drain pipe; and at least one annular mechanical fastener adapted to mechanically secure the clamshell jacket and the received tubular sleeve to the underlying drain pipe, wherein the annular mechanical fastener is adapted to clamp along a circumferential direction of the received tubular sleeve;

wherein both the at least one tubular sleeve and the clamshell jacket comprise a sound-insulating foam material.

2. The pipe lagging system according to claim 1, wherein the sound-insulating foam material comprises at least one polyolefinic foam.

3. The pipe lagging system according to claim 1, wherein at least one of the at least one tubular sleeve and clamshell jacket is made of a composite material.

4. The pipe lagging system according to claim 3, wherein the composite material comprises a foam core and an outer skin, wherein the skin has a higher density than the core.

5. The pipe lagging system according to claim 4, wherein the foam core has a density in the range from about 1.0 pcf to 10 pcf.

6. The pipe lagging system according to claim 4, wherein the outer skin has a density ranging from 40 pcf to 65 pcf.

7. The pipe lagging system according to claim 4, wherein the foam core has a convoluted or contoured inner surface to be in contact with the drain pipe.

8. The pipe lagging system according to claim 1, wherein the foam has a compression resistance at 25% compression ranging from about 3-25 psi.

9. The pipe lagging system according to claim 1, wherein the clamshell jacket is adapted to receive the end of the tubular sleeve such that the drain pipe connector and drain pipe are fully encapsulated by the lagging system.

10. The pipe lagging system according to claim 1, wherein the clamshell jacket comprises at least one notch arranged in circumferential direction on the outer shell surface, and adapted for receiving the mechanical fastener.

11. The pipe lagging system according to claim 1, wherein the mechanical fastener comprises a flexible strap and a locking system for uniformly clamping along circumferential direction the clamshell jacket and the sleeve to the piping system.

12. The pipe lagging system according to claim 11, wherein the locking system is a ratcheting or latching lock.

13. The pipe lagging system according to claim 1, wherein the preformed acoustic lagging sleeve is adapted to fully enclose the drain pipe in circumferential direction without seams.

14. The pipe lagging system according to claim 1, wherein the clamshell jacket is a hinged clamshell jacket comprising two half shells coupled to each other by at least one hinge.

15. The pipe lagging system according to claim 1, wherein the clamshell jacket is adapted to substantially conform to the shape of the connector.

16. The pipe lagging system according to claim 1, wherein the at least one preformed acoustic lagging sleeve does not comprise a slit with adhesive and/or tape.

17. A method of installing a pipe lagging system for acoustically insulating a drain piping system comprising at least one drain pipe and drain pipe connector coupled to the drain pipe, the method comprising:

sliding at least one preformed acoustic lagging sleeve over the drain pipe of the piping system for acoustical insulation;

snapping at least one preformed acoustic clamshell jacket over the drain pipe connector of the piping system for acoustically insulating the pipe connector, wherein the clamshell jacket receives an end portion of the tubular sleeve put over the drain pipe; and securing the clamshell jacket and the received tubular sleeve to the underlying drain pipe with at least one annular mechanical fastener, wherein the annular mechanical fastener clamps along a circumferential direction of the received tubular sleeve;

wherein both the at least one tubular sleeve and the clamshell jacket comprise a sound-insulating foam material.

18. The pipe lagging system according to claim 4, wherein the foam core has a density in the range from about 1.5 pcf to 10 pcf.

19. The pipe lagging system according to claim 4, wherein the foam core has a density in the range from about 1.3 to 2.0 pcf.

20. The pipe lagging system according to claim 4, wherein the outer skin has a density ranging from 55 pcf to 62 pcf.

21. The pipe lagging system according to claim 1, wherein the foam has a compression resistance at 25% compression ranging from about 3-8 psi.

* * * * *